(12) United States Patent
Su et al.

(10) Patent No.: US 12,199,315 B2
(45) Date of Patent: Jan. 14, 2025

(54) BATTERY CELL, BATTERY, POWER CONSUMPTION DEVICE AND BATTERY CELL MANUFATURING METHOD AND DEVICE

(71) Applicant: CONTEMPORARY AMPEREX TECHNOLOGY (HONG KONG) LIMITED, Hong Kong (CN)

(72) Inventors: Huasheng Su, Ningde (CN); Chengyou Xing, Ningde (CN); Quankun Li, Ningde (CN); Peng Wang, Ningde (CN); Wenzhong Liu, Ningde (CN); Yanyun Qin, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 559 days.

(21) Appl. No.: 17/554,412

(22) Filed: Dec. 17, 2021

(65) Prior Publication Data

US 2022/0247043 A1 Aug. 4, 2022

Related U.S. Application Data

(63) Continuation of application No. PCT/CN2021/074514, filed on Jan. 29, 2021.

(51) Int. Cl.
*H01M 50/559* (2021.01)
*H01M 10/42* (2006.01)
(Continued)

(52) U.S. Cl.
CPC ....... *H01M 50/559* (2021.01); *H01M 10/425* (2013.01); *H01M 10/482* (2013.01);
(Continued)

(58) Field of Classification Search
None
See application file for complete search history.

(56) References Cited

U.S. PATENT DOCUMENTS 3,966,496 A 6/1976 Kelm
2002/0168565 A1* 11/2002 LeBouchard ....... H01M 50/536
429/211
(Continued)

FOREIGN PATENT DOCUMENTS

CN 203377303 U 1/2014
CN 106688123 A 5/2017
(Continued)

OTHER PUBLICATIONS

First Office Action dated Apr. 17, 2024 received in Chinese Patent Application No. CN 202180049154.8.
(Continued)

*Primary Examiner* — Gregg Cantelmo
(74) *Attorney, Agent, or Firm* — Scully, Scott, Murphy & Presser, P.C.

(57) ABSTRACT

An embodiment of the present application provides a battery cell, a battery, a power consumption device, and a battery cell manufacturing method and device, which belong to the field of battery technologies. The battery cell includes an adapting member, the adapting member includes a first connection portion for connecting an electrode terminal and a second connection portion for connecting an electrode assembly, the first connection portion and the second connection portion are dividedly set and connected to each other, and the first connection portion is in a multilayer structure and includes multiple layers of conductive sheets provided in a stacking manner, the second connection portion is in a single-layer structure, and a minimum thickness
(Continued)

of the first connection portion is greater than a maximum thickness of the second connection portion.

19 Claims, 9 Drawing Sheets

(51) Int. Cl.
| | | |
|---|---|---|
| H01M 10/48 | (2006.01) | |
| H01M 50/152 | (2021.01) | |
| H01M 50/179 | (2021.01) | |
| H01M 50/528 | (2021.01) | |
| H01M 50/534 | (2021.01) | |
| H01M 50/538 | (2021.01) | |
| H01M 50/545 | (2021.01) | |
| H01M 50/548 | (2021.01) | |
| H01M 50/566 | (2021.01) | |
| H01M 50/567 | (2021.01) | |

(52) U.S. Cl.
CPC ....... *H01M 50/152* (2021.01); *H01M 50/179* (2021.01); *H01M 50/528* (2021.01); *H01M 50/534* (2021.01); *H01M 50/538* (2021.01); *H01M 50/545* (2021.01); *H01M 50/548* (2021.01); *H01M 50/566* (2021.01); *H01M 50/567* (2021.01); *H01M 2220/20* (2013.01)

(56) References Cited

U.S. PATENT DOCUMENTS

| | | |
|---|---|---|
| 2012/0040239 A1 | 2/2012 | Takahashi et al. |
| 2013/0089996 A1 | 4/2013 | Zhao |
| 2014/0069690 A1 | 3/2014 | Diez et al. |
| 2017/0294684 A1 | 10/2017 | Sato et al. |
| 2018/0108878 A1 | 4/2018 | Fees et al. |
| 2018/0108886 A1 | 4/2018 | Fees et al. |
| 2018/0108895 A1 | 4/2018 | Fees et al. |
| 2018/0108896 A1 | 4/2018 | Fees et al. |
| 2018/0108897 A1 | 4/2018 | Fees et al. |
| 2018/0108899 A1 | 4/2018 | Fees et al. |
| 2018/0108900 A1 | 4/2018 | Fees et al. |
| 2018/0108901 A1 | 4/2018 | Fees et al. |
| 2018/0108955 A1 | 4/2018 | Fees et al. |
| 2019/0081312 A1* | 3/2019 | Yang .................. H01M 10/613 |
| 2019/0329825 A1 | 10/2019 | Fees et al. |
| 2020/0099035 A1 | 3/2020 | Fees et al. |
| 2020/0168882 A1 | 5/2020 | Fees et al. |
| 2020/0343514 A1 | 10/2020 | Fees et al. |
| 2020/0343515 A1 | 10/2020 | Fees et al. |
| 2021/0104718 A1 | 4/2021 | Fees et al. |
| 2021/0288384 A1 | 9/2021 | Fees et al. |

FOREIGN PATENT DOCUMENTS

| | | |
|---|---|---|
| CN | 206236738 U | 6/2017 |
| CN | 208507745 U | 2/2019 |
| CN | 209312879 U | 8/2019 |
| CN | 112072058 A | 12/2020 |
| CN | 112242593 A | 1/2021 |
| DE | 102011076624 A1 | 11/2012 |
| JP | 2012038650 A | 2/2012 |
| WO | 2017063878 A1 | 4/2017 |
| WO | 2019165677 A1 | 9/2019 |
| WO | 2019184494 A1 | 10/2019 |
| WO | 2020252803 A1 | 12/2020 |

OTHER PUBLICATIONS

Extended European Search Report dated Mar. 30, 2023 received in European patent Application No. EP 21820071.5.

* cited by examiner

BATTERY CELL, BATTERY, POWER CONSUMPTION DEVICE AND BATTERY CELL MANUFATURING METHOD AND DEVICE

CROSS-REFERENCE TO RELATED APPLICATIONS

This application is a continuation of International Application No. PCT/CN2021/074514, filed on Jan. 29, 2021, the disclosure of which is hereby incorporated by reference in its entirety.

TECHNICAL FIELD

The present application relates to the field of battery technologies, and in particular, to a battery cell, a battery, a power consumption device, and a battery cell manufacturing method and device.

BACKGROUND

Energy conservation and emission reduction are the key to the sustainable development of the automotive industry. Electric vehicles have become an important part of the sustainable development of the automotive industry due to their advantages of energy conservation and environmental protection. For the electric vehicles, the battery technology is an important factor for their development.

An output power of a battery is an important evaluation index of performance of the battery. In the related art, the output power of the battery is low, which cannot meet the requirements of a power-type battery. Therefore, how to improve the output power of the battery is an urgent technical problem to be solved in the battery technology.

SUMMARY

The purpose of the present application is to provide a battery cell, a battery, a power consumption device, and a battery cell manufacturing method and device. The battery cell has small internal resistance, which can increase an output power of the battery cell, and meet the requirements of a power-type battery.

The present application is implemented through the following technical solutions:

On the one hand, the present application provides a battery cell, including:

an adapting member, including a first connection portion for connecting an electrode terminal and a second connection portion for connecting an electrode assembly, the first connection portion and the second connection portion are dividedly set and connected to each other, and the first connection portion is in a multilayer structure and includes multiple layers of conductive sheets provided in a stacking manner, the second connection portion is in a single-layer structure, and a minimum thickness of the first connection portion is greater than a maximum thickness of the second connection portion.

According to the battery cell of the embodiment of the present application, a multilayer configuration of the first connection portion facilitates the bending of the first connection portion, and the thickness of the first connection portion is increased while meeting the requirements of convenient bending and process welding, the adapting member has a larger overcurrent area, an overcurrent capacity of the adapting member is high, and resistance of the adapting member is small, which improve the output power of the battery cell and meet the requirements of the power-type battery.

In some embodiments of the present application, a minimum thickness of the second connection portion is greater than a maximum thickness of any of the multiple layers of conductive sheets.

In the above solution, the thickness of the second connection portion is greater than the thickness of any of the multiple layers of conductive sheets, so that the thickness of each layer of the conductive sheet is thinner, which reduces bending difficulty of the first connection portion and facilitates the implementation of the bending of the first connection portion.

In some embodiments of the present application, a thickness of each layer of the multiple layers of conductive sheets is equal.

In the above solution, the thickness of each layer of the conductive sheet is equal, which is convenient for processing, modularized production, and reduces the processing cost; at the same time, it is convenient to implement the bending of the first connection portion, and the bending effect of the first connection portion is good.

In some embodiments of the present application, two adjacent layers of the multiple layers of conductive sheets are welded or connected by a conductive adhesive.

In the above solution, the connection modes of the two adjacent layers of the conductive sheet can ensure the connection strength, and at the same time can ensure the passage of a current.

In some embodiments of the present application, the first connection portion and the second connection portion are welded or connected by a conductive adhesive.

In the above solution, adopting the method of welding or the conductive adhesive connection can ensure the connection strength and the passage of the current.

In some embodiments of the present application, the second connection portion includes a first surface facing an electrode assembly and a second surface facing away from the electrode assembly, and the first connection portion is connected to the second surface.

In the above solution, the second surface of the second connection portion facing away from the electrode assembly is connected to the first connection portion, which can avoid interference in the welding of the second connection portion to the electrode assembly, and ensure a stable connection between the second connection portion and the electrode assembly.

In some embodiments of the present application, the first connection portion includes a first section, a second section, and a third section. The first section is configured to connect to the second connection portion, the third section is configured to connect to the electrode terminal, and the second section connects the first section and the third section, and the first section and the third section are respectively located on two sides of the second section in a thickness direction.

In the above solution, the first connection portion bends in an S shape, so that the bending extension of each layer of the conductive sheet is the same, that is, edges of two ends of each layer of the conductive sheet are flush; and then, on the one hand, so that the force on each layer of the each layer of the conductive sheet of the first connection portion is uniform and is not prone to breakage, on the other hand, a height of the first connection portion after bending is controlled, so that to ensure the energy density of the battery cell, and avoid the problems such as the phenomenon of delamination occurs in the multilayer structure, the inner layer easily wrinkles, the height increases after bending lead by this, an installation space is occupied, and assembly of the battery cell is not convenient.

In some embodiments of the present application, two adjacent layers of the multiple layers of conductive sheets are welded or connected by a conductive adhesive at the third section, so that to make the hardness of the third section greater than the hardness of the second section.

In the above solution, the hardness of the third section is greater than the hardness of the second section, which facilitates to implement the bending of the third section relative to the second section and reduces the bending difficulty.

In some embodiments of the present application, two adjacent layers of the multiple layers of conductive sheets are welded or connected by a conductive adhesive at the first section, so that to make the hardness of the first section greater than the hardness of the second section.

In the above solution, the hardness of the first section is greater than the hardness of the second section, which facilitates to implement the bending of the second section relative to the first section and reduces the bending difficulty.

In some embodiments of the present application, the second connection portion includes a first connection region for connecting to the first connection portion and two second connection regions for connecting to the electrode assembly, and the first connection region is located between the two connection regions.

In the above solution, the first connection region is located between the two second connection regions to ensure the stable connection between the second connection portion and the electrode assembly.

In some embodiments of the present application, the second connection portion includes a main body region, a first connection region for connecting to the first connection portion, and the two second connection regions for connecting to the electrode assembly, and the first connection region is located between the two second connection regions, a maximum thickness of the first connection region is smaller than a minimum thickness of the main body region, and the maximum thickness of the first connection region is smaller than the minimum thickness of one of the two second connection regions that has the smaller thickness.

In the above solution, the thickness configuration of the first connection region reduces an assembly height of the first connection portion and the second connection portion, reduces the space occupation, and improves the energy density of the battery cell.

In some embodiments of the present application, the electrode terminal includes a first connection member and two second connection members, and the battery cell further includes: a housing with an end opening, and the electrode assembly and the adapting member are provided inside the housing; an end cover, which is configured to cover the end opening, the two second connection members are installed on the end cover and arranged at intervals along a first direction; the two second connection members are both connected to the first connection portion, and the first connection member is located on a side away from the inside of the housing of the end cover and connected to the two second connection members; a first insulating member, which is provided between the first connection member and the end cover, which is configured to isolate the first connection member and the end cover.

In the above solution, the first insulating member isolates the first connection member and the end cover to achieve insulation between the first connection member and the end cover.

In some embodiments of the present application, the first connection member includes a first side, a second side, a third side, and a fourth side; the second side and the third side are provided oppositely along the first direction, and the first side and the fourth side are provided oppositely along a second direction; the second direction, the first direction and the thickness direction of the end cover are perpendicular to each other; the first side, the second side and the third side are all planes, and the fourth side is an arc surface centered on a center of the end cover.

In the above solution, the configuration method of the first connection member can increase an overcurrent, and can also prevent the first insulating member from being deformed and damaged during welding and assembling.

On the other hand, the present application further provides a battery, including the above battery cell.

On the other hand, the present application further provides a power consumption device, including the above battery.

On the other hand, the present application further provides a battery cell manufacturing method, including:
providing an electrode terminal;
providing an electrode assembly;
providing an adapting member, including a first connection portion and a second connection portion, the first connection portion and the second connection portion are dividedly set and connected to each other, and the first connection portion is in a multilayer structure and includes multiple layers of conductive sheets provided in a stacking manner, the second connection portion is in a single-layer structure, and a minimum thickness of the first connection portion is greater than a maximum thickness of the second connection portion; and
connecting the first connection portion to the electrode terminal, and connecting the second connection portion to the electrode assembly.

On the other hand, the present application further provides a battery cell manufacturing device, including:
a provision module, configured to:
provide an electrode terminal;
provide an electrode assembly;
provide an adapting member, including a first connection portion and a second connection portion, the first connection portion and the second connection portion are dividedly set and connected to each other, and the first connection portion is in a multilayer structure and includes multiple layers of conductive sheets provided in a stacking manner, the second connection portion is in a single-layer structure, and the minimum thickness of the first connection portion is greater than a maximum thickness of the second connection portion;
an installation module, configured to connect the first connection portion to the electrode terminal, and connect the second connection portion to the electrode assembly.

The above description is only a summary of the technical solutions of the embodiments of the present application. In order to understand the technical means in the embodiments of the present application more clearly, it can be implemented in accordance with the content of the specification; and in order to make the above and other objectives, features and characteristics of the embodiments of the present application more obvious and easier to understand, and the specific embodiments of the application are cited below.

BRIEF DESCRIPTION OF DRAWINGS

In order to illustrate the technical solution in the embodiments of the present application more clearly, brief description will be made below to the drawings required in the embodiments of the present application. Apparently, the drawings described below are some embodiments of the present application only, and other drawings could be obtained based on these drawings by those ordinary skilled in this field without creative efforts.

Figure 1:
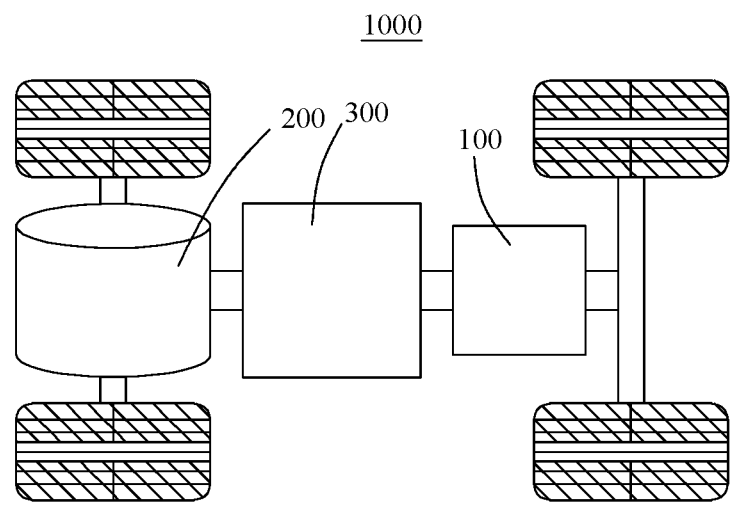
FIG. 1 is a schematic structural diagram of a vehicle according to an embodiment of the present application.

In the drawings, the drawings are not drawn to actual scale.

Marking description: 1000—vehicle; 100—battery; 101—battery cell; 11—adapting member; 110—conducting strip; 111—first connection portion; 1111—first section; 1112—second section; 1113—third section; 1114—first connection hole; 1115—second connection hole; 112—second connection portion; 1120—main body region; 1121—first connection region; 1122—second connection region; 1123—through hole; 1124—first surface; 1125—second surface; 113—first bending region; 114—second bending region; 115—first bending axis; 116—second bending axis; 12—electrode terminal; 121—first connection member; 1211—first side; 1212—second side; 1213—third side; 1214—fourth side; 1215—third connection hole; 1216—fourth connection hole; 122—second connection member; 13—electrode assembly; 14—housing; 141—end opening; 150—end cover assembly; 151—end cover; 153—first insulating member; 1531—bottom wall; 1532—peripheral wall; 1533—fifth connection hole; 1534—sixth connection hole; 154—sealing ring; 155—second insulating member; 102—box body; 1021—first portion; 1022—second portion; 200—motor; 300—controller.

DESCRIPTION OF EMBODIMENTS

Implementations of the present application will be further described below in detail with reference to the drawings and embodiments. The detailed description of the following embodiments and the accompanying drawings are used to exemplarily illustrate principles of the present application, but cannot be used to limit the scope of the present application, that is, the present application is not limited to the described embodiments.

Unless otherwise defined, all technological and scientific terms used herein have the same meanings as those commonly understood by those skilled in the art to which the present application belongs. The terms used in the specification herein are merely for the purpose of describing specific embodiments, but are not intended to limit the present application. The terms "including" and "having" and any variations thereof in the specification and the claims of the present application as well as the brief description of the drawings described above are intended to cover non-exclusive inclusion.

The phrase "embodiments" referred to herein means that specific features, structures, or characteristics described in conjunction with the embodiments may be included in at least one embodiment of the present application. The phrase at various locations in the specification does not necessarily refer to the same embodiment, or an independent or alternative embodiment exclusive of another embodiment. Those skilled in the art understand, in explicit and implicit manners, that an embodiment described herein may be combined with another embodiment.

It should be noted that similar reference numerals and letters indicate similar items in the following drawings. Therefore, once a certain item is defined in one drawing, it is unnecessary to further define and explain it in the subsequent drawings.

In the description of the present application, it should be understood that orientations or positional relationships indicated by terms such as "center", "length", "width", "thickness", "bottom", "inside", "outside" and "circumferential direction" are orientations or positional relationships shown based on the drawings, and the terms are merely for convenience of describing the present application and for simplifying the description, but for indicating or implying that an indicated apparatus or element must have a specific orientation, and must be constructed and operated in a specific orientation, which thus may not be understood as limiting the present application. In addition, the terms "first", "second" and the like in the specification and the claims of the present application as well as the above drawings are used to distinguish different objects, rather than to describe a specific order, which may explicitly or implicitly include one or more features. In the descriptions in the present application, unless otherwise provided, "a plurality of" means two or more than two.

In the description of the present application, it should be noted that unless otherwise explicitly specified and defined, the terms "mounting", "connecting" and "connection" should be understood in a broad sense, for example, they may be a fixed connection, a detachable connection, or an integrated connection, may be a mechanical connection, or may be an electrical connection; may be a direct connection and may also be an indirect connection via an intermediate medium, or may be communication between the interiors of two elements. Those of ordinary skill in the art may appreciate the specific meanings of the foregoing terms in the present application to specific circumstances.

In the present application, battery cells may include lithium-ion secondary batteries, lithium-ion primary batteries, lithium-sulfur batteries, sodium lithium-ion batteries, sodium-ion batteries or magnesium-ion batteries, etc., which are not limited by the embodiments of the present application. The battery cells may be cylindrical, flat, cuboid or other shapes, which is not limited by the embodiments of the present application. The battery cell is generally divided into three types according to the way of packaging: a cylindrical battery cell, a square battery cell and a soft package battery cell, which is also not limited in the embodiments of the present application.

The battery mentioned in the embodiment of the present application refers to a single physical module that includes one or more battery cells to provide a higher voltage and capacity. For example, the battery mentioned in the present application may include a battery module or a battery pack. The battery generally includes a box body for enclosing one or more battery cells. The box body may prevent liquid or other foreign matters from affecting the charging or discharging of the battery cells.

The battery cells include an electrode assembly and an electrolyte, and the electrode assembly is composed of a positive electrode sheet, a negative electrode sheet and a separator. The operation of the battery cells mainly relies on the movement of metal ions between the positive electrode sheet and the negative electrode sheet. The positive electrode sheet includes a positive electrode current collector and a positive electrode active material layer. The positive electrode active material layer is coated on a surface of the positive electrode current collector, and the current collector not coated with the positive electrode active material layer protrudes from the current collector coated with the positive electrode active material layer and is used as a positive tab. In an example of a lithium-ion battery, the material of the positive electrode current collector may be aluminum, and the positive electrode active material may be lithium cobalt oxide, lithium iron phosphate, ternary lithium, lithium manganate oxide, or the like. The negative electrode sheet includes a negative electrode current collector and a negative electrode active material layer. The negative electrode active material layer is coated on a surface of the negative electrode current collector, and the current collector not coated with the negative electrode active material layer protrudes from the current collector coated with the negative electrode active material layer and serves as a negative tab. A material of the negative electrode current collector may be copper, and a negative electrode active material may be carbon, silicon, or the like. In order to ensure that no fusing occurs when a large current passes through, there are a plurality of positive tabs which are stacked together, and there are a plurality of negative tabs which are stacked together. A material of the separator may be polypropylene (PP) or polyethylene (PE), etc. In addition, the electrode assembly may be a winding structure or a laminated structure, and the embodiments of the present application are not limited thereto.

The battery cell also includes an adapting member and an electrode terminal, the adapting member is configured to connect the electrode assembly to the electrode terminal so as to derive electric energy of the electrode assembly through the electrode terminal. Correspondingly, the electrode terminal connected to the positive electrode tab is a positive electrode terminal, and the electrode terminal connected to the negative electrode tab is a negative electrode terminal. In order to facilitate an assembly of the battery cell and save a space occupied by the adapting member, the adapting member generally bends to reduce an assembly height.

The applicant finds that the main reason for a low output power of the battery cell is a heat loss, and there are many reasons for the heat loss of the battery cell, such as a poor heat management effect, large internal resistance of the battery cell, etc. Through the research, the applicant further finds that as a component connecting the electrode assembly to the electrode terminal in the battery cell, resistance of the adapting member directly affects the internal resistance of the whole battery cell, and then affects the output power of the battery cell; in production and processing, in order to facilitate bending and process welding, a thickness of the adapting member is usually small, resulting that an overcurrent area of the adapting member is small, the resistance of the adapting member is larger and voltage drop loss occurs. As a result, the internal resistance of the battery cell is larger and the output power of the battery cell is lower.

In view of this, the present application provides a technical solution in which on the premise of convenient bending and process welding, the thickness of the adapting member is locally increased to increase the overcurrent area, so that to improve an overcurrent capacity of the adapting member, reduce the resistance of the adapting member, improve the output power of the battery cell and meet the requirements of the power battery.

The technical solutions described in the embodiments of the present application are all applicable to various apparatuses using batteries, such as mobile phones, portable devices, notebook computers, electromobiles, electronic toys, electric tools, electric vehicles, ships and spacecrafts. For example, the spacecrafts include airplanes, rockets, space shuttles and spaceships, and the like.

It should be understood that the technical solutions described in the embodiments of the present application are not only applicable to the devices described above, but also applicable to all devices using batteries. However, for brief description, the following embodiments are all described by an example of an electric vehicle.

For example, FIG. 1 shows a schematic structural diagram of a vehicle 1000 according to an embodiment of the present application. The vehicle 1000 may be a fuel-powered vehicle, a gas-powered vehicle or a new energy vehicle, and the new energy vehicle may be a battery electric vehicle, a hybrid vehicle, an extended-range vehicle, or the like. A battery 100 is provided inside the vehicle 1000. For example, the battery 100 may be disposed at the bottom, head or tail of the vehicle 1000. The battery 100 may be configured to supply power to the vehicle 1000. For example, the battery 100 may be used as an operation power supply of the vehicle 1000 and is used for a circuit system of the vehicle 1000, for example, for a working power demand of the vehicle 1000 during startup, navigation and running. In another embodiment of the present application, the battery 100 may serve not only as an operation power source of the vehicle 1000, but also as a driving power source of the vehicle 1000, replacing or partially replacing fuel or natural gas to provide driving power for the vehicle 1000.

A motor 200 and a controller 300 may also be provided inside the vehicle 1000. The controller 300 is used to control the battery 100 to supply power to the motor 200, for example, for starting, navigating, and working power requirements during driving of the vehicle 1000.

In order to meet different power requirements, the battery 100 may include a plurality of battery cells, where the plurality of battery cells may be in series connection, parallel connection or series-parallel connection. The series-parallel connection refers to a combination of series connection and parallel connection. The battery 100 may also be referred to as a battery pack. In some embodiments, the plurality of battery cells may first be connected in series or in parallel or in a hybrid manner to form battery modules, and then a plurality of battery modules are connected in series or in parallel or in a hybrid manner to form a battery 100. That is, a plurality of battery cells may directly form a battery 100, or may first form battery modules, and then the battery modules form a battery 100.

Figure 2:
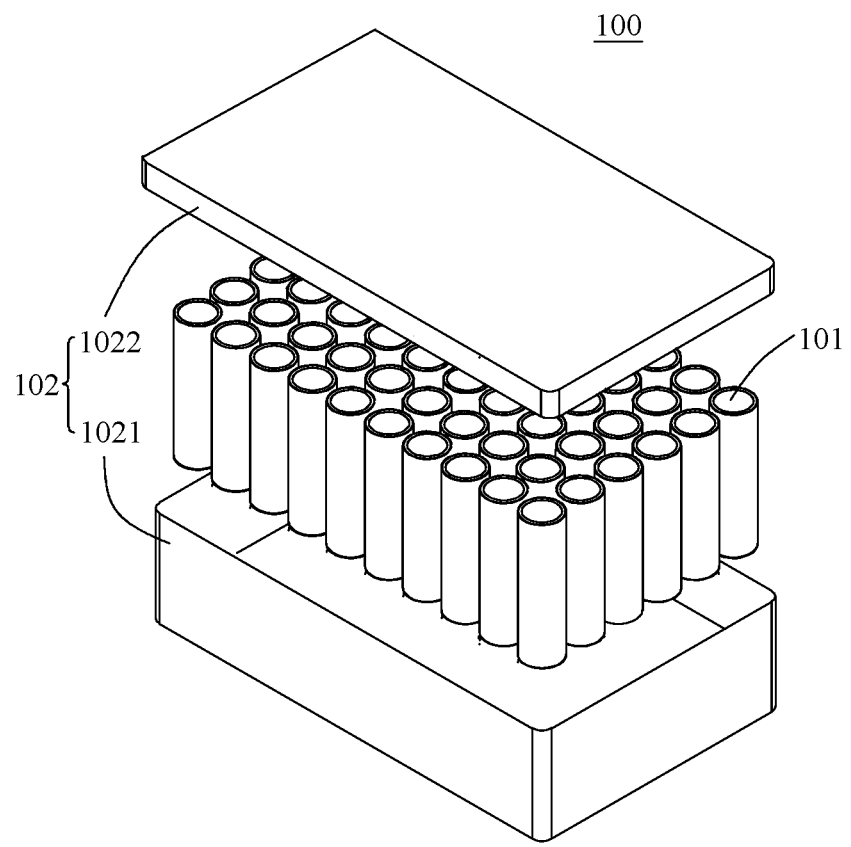
FIG. 2 is a schematic structural diagram of a battery according to an embodiment of the present application.

FIG. 2 shows a schematic structural diagram of a battery 100 according to an embodiment of the present application. In FIG. 2, the battery 100 may include a plurality of battery cells 101 and a box body 102 with a hollow structure inside, and the plurality of battery cells 101 are accommodated in the box body 102. The box body 102 includes a first portion 1021 and a second portion 1022, the first portion 1021 includes an accommodating space with an opening, and the second portion 1022 is configured to cover the opening of the accommodating space to connect to the first portion 1021 to form an accommodating cavity for accommodating the plurality of battery cells 101.

Figure 3:
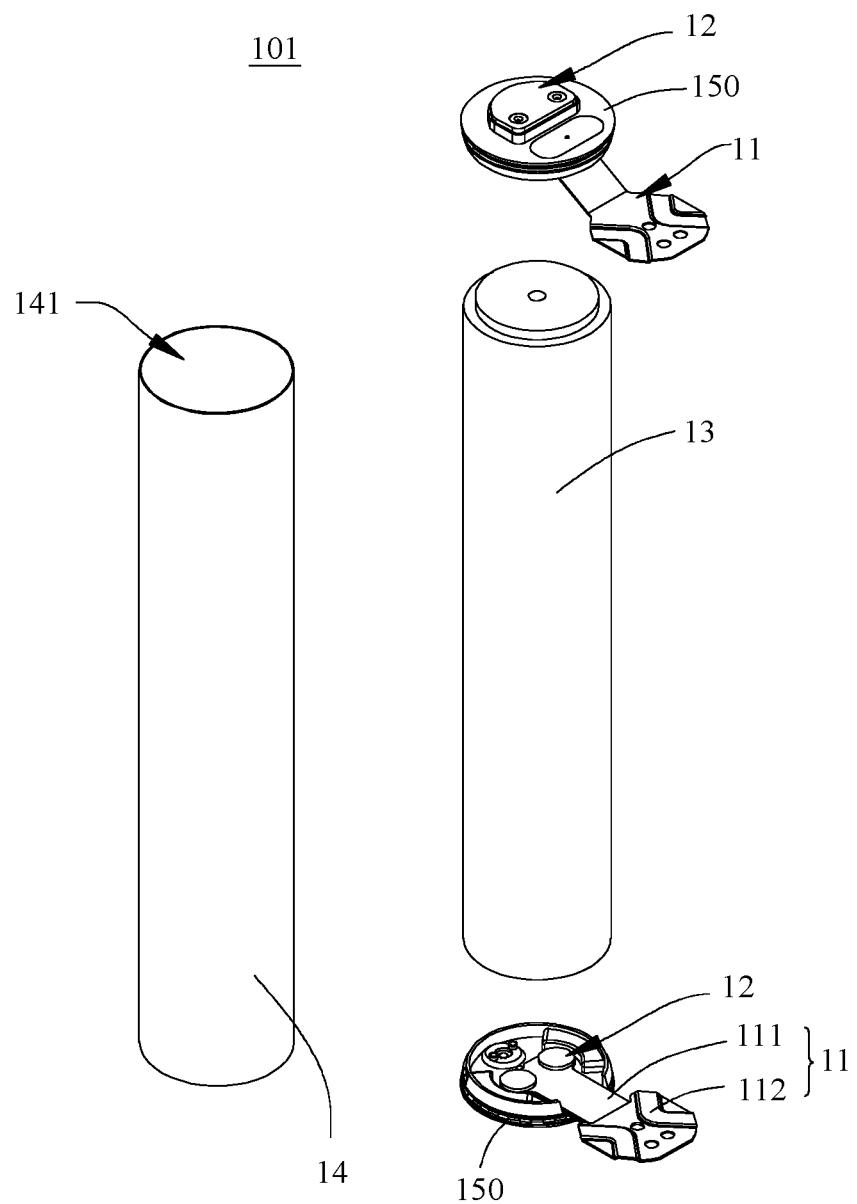
FIG. 3 is an exploded view of a battery cell according to an embodiment of the present application.

FIG. 3 shows an exploded diagram of the battery cell 101 according to an embodiment of the present application. As shown in FIG. 3, the battery cell 101 includes two electrode terminals 12, an electrode assembly 13 and an adapting member 11. The two electrode terminals 12 include a positive electrode terminal and a negative electrode terminal; the positive electrode terminal is configured to connect to the positive tab, and the negative electrode terminal is used to connect to the negative tab; and the positive electrode terminal corresponds to one adapting member 11, and the negative electrode terminal corresponds to one adapting member 11.

Figure 4:
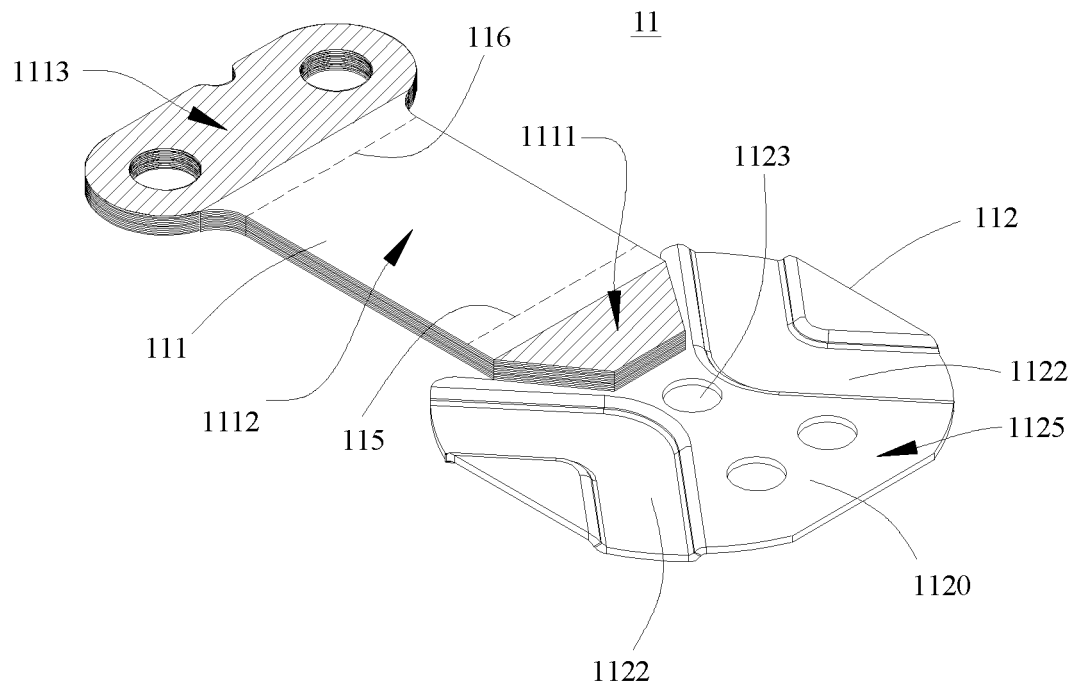
FIG. 4 is a schematic diagram of an expansion state of an adapting member according to an embodiment of the present application.
Figure 5:
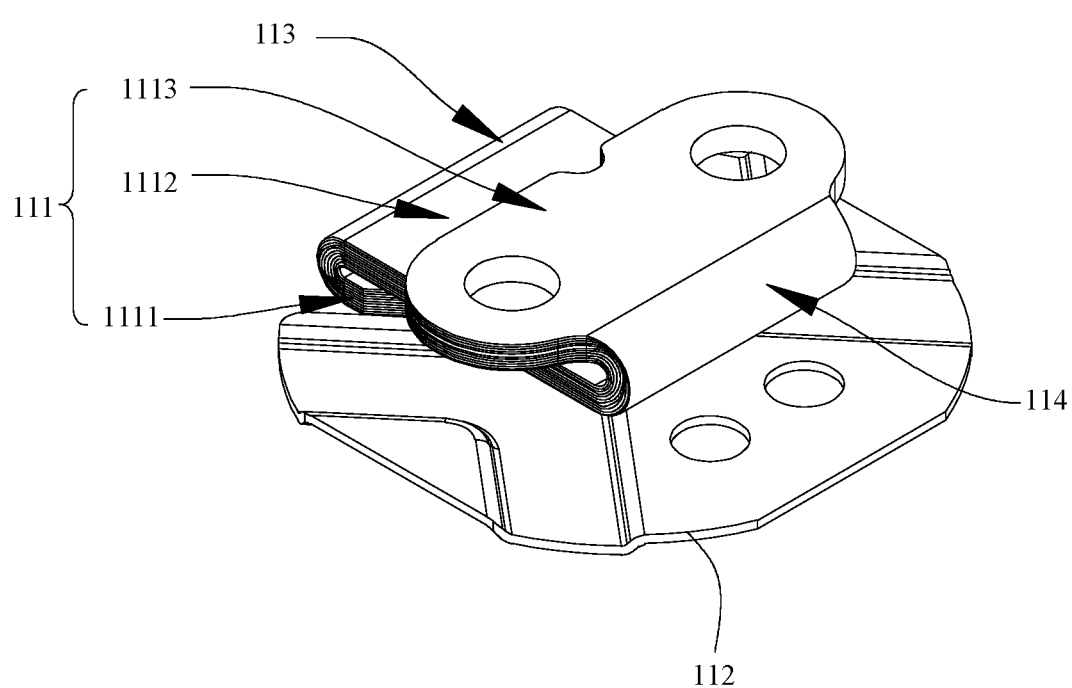
FIG. 5 is a schematic diagram of a bending state of the adapting member according to an embodiment of the present application.
Figure 6:
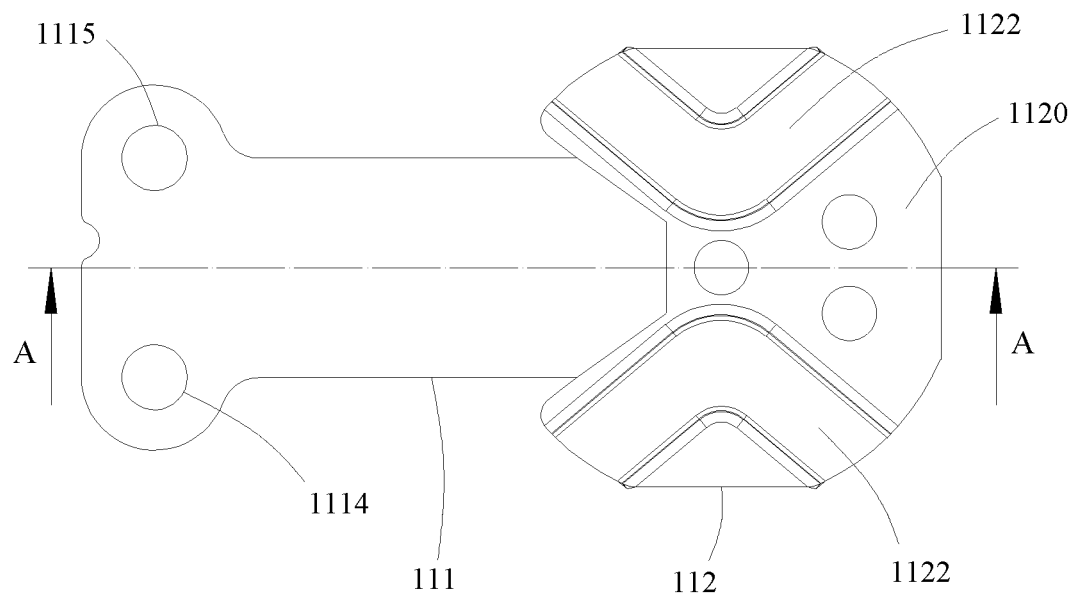
FIG. 6 is a top view of the adapting member according to an embodiment of the present application.
Figure 7:
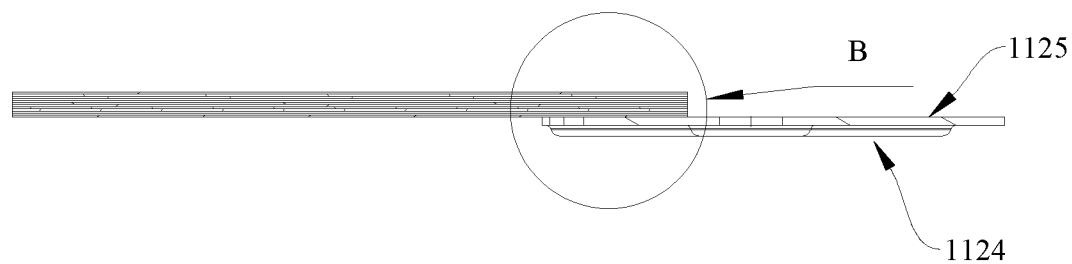
FIG. 7 is a cross-sectional view of an A-A direction in FIG. 6.
Figure 8:
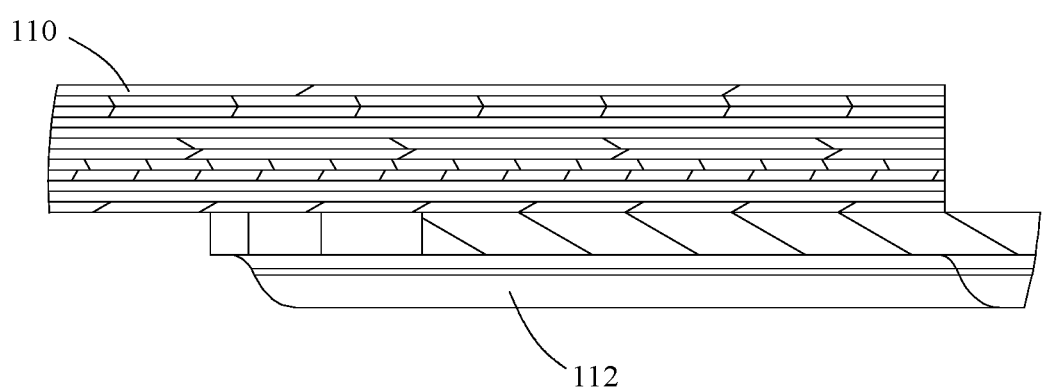
FIG. 8 is an enlarged view of the point B in FIG. 7.

FIG. 4 shows a schematic diagram of the adapting member 11 before bending according to an embodiment of the present application; FIG. 5 shows a schematic diagram of the adapting member 11 after bending according to embodiment of the present application; FIG. 6 shows a top view of the adapting member 11 according to an embodiment of the application; FIG. 7 is a cross-sectional view in the A-A direction in FIG. 6, and FIG. 8 is an enlarged view of the point B in FIG. 7.

In FIG. 4-FIG. 8, the adapting member 11 includes a first connection portion 111 for connecting the electrode terminal 12 (as shown in FIG. 3) and a second connection portion 112 for connecting the electrode assembly 13 (as shown in FIG. 3), the first connection portion 111 and the second connection portion 112 are dividedly set and connected to each other. The first connection portion 111 is in a multilayer structure and includes multiple layers of conductive sheets 110 provided in a stacking manner, the second connection portion 112 is in a single-layer structure, and a minimum thickness of the first connection portion 111 is greater than a maximum thickness of the second connection portion 112.

The battery cell 101, the multilayer configuration of the first connection portion 111 facilitates the bending of the first connection portion 111; and the thickness of the first connection portion 111 is increased while meeting the requirements of convenient bending and process welding, the adapting member 11 has a large overcurrent area, an overcurrent capacity of the adapting member 11 is strong, and resistance of the adapting member 11 is small, which improve the output power of the battery cell 101 and meet the requirements of a power-type battery. At the same time, the multilayer structure of the first connection portion 111 can also absorb and disperse the stress during bending, and reduce the fatigue of the adapting member 11 at a bending position.

It should be pointed out that, the conducting strip 110 may be a metal sheet (for example, a copper sheet, an aluminum sheet or other conductive metal sheets), which has good conductivity, so as to facilitate the extraction of electrical energy from the electrode assembly 13. The conductive sheet 110 may also be a non-metal conductive sheet, such as a graphite sheet and a conductive ceramic sheet. The minimum thickness of the first connection portion 111 means that, when the first connection portion 111 is in an irregular thickness structure, for example, when the conducting sheet 110 is in a sheet-shaped structure of unequal-thickness, the thickness value at the minimum thickness of the first connection portion 111 as a whole is the minimum thickness of the first connection portion 111; when the first connection portion 111 is in a structure of regular thickness, for example, when the conductive sheet 110 is in a sheet-shaped structure of equal-thickness, the total thickness value of the plurality of conductive sheets 110 is the minimum thickness of the first connection portion 111. The maximum thickness of the second connection portion 112 means that, when the second connection portion 112 is in an unequal-thickness structure, the thickness value at the maximum thickness of the second connection portion 112 is the maximum thickness of the second connection portion 112; when the second connection portion 112 is in an equal-thickness structure, the thickness value at any position of the second connection portion 112 is the maximum thickness of the second connection portion 112.

In some embodiments of the present application, the minimum thickness of the second connection portion 112 is greater than the maximum thickness of any of the conductive sheet 110 of the multiple layers of conductive sheets 110. It can be understood that, the thickness of the second connection portion 112 is greater than the thickness of any of the conductive sheet 110, that is, the thickness of the conductive sheet 110 can be thinner, which reduces bending difficulty of the first connection portion 111 and facilitates the implementation of the bending of the first connection portion 111, thereby ensuring that the height of the adapting member 11 is lower after bending, reducing space occupation, and ensuring the energy density of the battery cell 101. For example, in FIG. 7 and FIG. 8, the thickness of the second connection portion 112 is greater than the thickness of any of the conductive sheet 110 of the multiple layers of conductive sheets 110.

In some embodiments of the present application, as shown in FIG. 3, the second connection portion 112 is in a shape of a disc, and a size of the second connection portion 112 is substantially the same as the size of an end face of the electrode assembly 13, and the second connection portion 112 has a larger contact area with the electrode assembly 13, which has a better overcurrent capacity. Therefore, the thickness of the second connection portion 112 can be smaller than the minimum thickness of the multiple layers of conductive sheets 110, and the second connection portion 112 does not need to be thickened or configured in the multilayer structure.

The second connection portion 112 and the electrode assembly 13 are connected and fixed by penetration welding. If the adapting member 11 adopts the multilayer structure entirely, that is, the second connection portion 112 also adopts the multilayer structure, the adapting member 11 cannot be thinned from the multiple layers to the thickness of process welding, and the multilayer structure is easy to crack when the multilayer structure is thinned; in addition, the adapting member 11 configured to connect to the negative tab needs to be electroplated in an area where it is welded to the negative tab, and the electrolytic solution will remain in the gaps of the multilayer structure during electroplating, causing corrosion and affecting use. In order to facilitate the welding between the second connection portion 112 and the electrode assembly 13, the thickness of the second connection portion 112 should not be too thick. For example, the thickness of the second connection portion 112 may be 0.3-0.4 mm. In order to facilitate the bending of the first connection portion 111, the thickness of any of the conductive sheet 110 of the multiple layers of conductive sheets 110 is smaller than the minimum thickness of the second connection portion, for example, the thickness of each layer of the conductive sheet of the multiple layers of conductive sheets 110 may be 0.05-0.1 mm, and the first connection portion 111 may include 8-10 layers of conductive sheets 110.

In some embodiments of the present application, the thickness of each layer of the conductive sheet 110 of the multiple layers of conductive sheets 110 is equal. The multiple layers of conductive sheets 110 adopts the same thickness, which is convenient for processing and modularized production, and reduces the processing cost.

In other embodiments of the present application, the thickness of each layer of the conductive sheet 110 of the multiple layers of conductive sheets 110 may also be unequal. According to different usage requirements, the multiple layers of conductive sheets 110 is designed as the conductive sheet 110 with different thickness specifications.

In some embodiments of the present application, two adjacent layers of the conductive sheet 110 of the multiple layers of conductive sheets 110 are welded or connected by conductive adhesive. Adopting the connection mode of welding or the conductive adhesive can ensure conductivity between the multiple layers of conductive sheets 110, so that to ensure the passage of a current and the connection strength at the same time. For example, two adjacent layers of the conductive sheet 110 are laser welded, so that the two adjacent layers of the conductive sheet 110 have better connection stability and can also ensure the passage of the current. In other embodiments of the present application, the connection mode of the two adjacent layers of the conductive sheet 110 may also be other modes that can implement metal connection, such as riveting, bolting, and the like.

In some embodiments of the present application, as shown in FIG. 4, the first connection portion 111 includes a first section 1111, a second section 1112 and a third section 1113, the first section 1111 is configured to connect to the second connection section 1112, the third section 1113 is configured to connect to the electrode terminal 12, and the second section 1112 connects the first section 1111 and the third section 1113; before the adapting member 11 bends, as shown in FIG. 4, the first section 1111 and the third section 1113 are located at both ends of the second section 1112 in a length direction of the adapting member 11; after the adapter 11 bends, as shown in FIG. 5, the first section 1111 and the third section 1113 are respectively located on two sides of the second section 1112 in a thickness direction.

Figure 9:
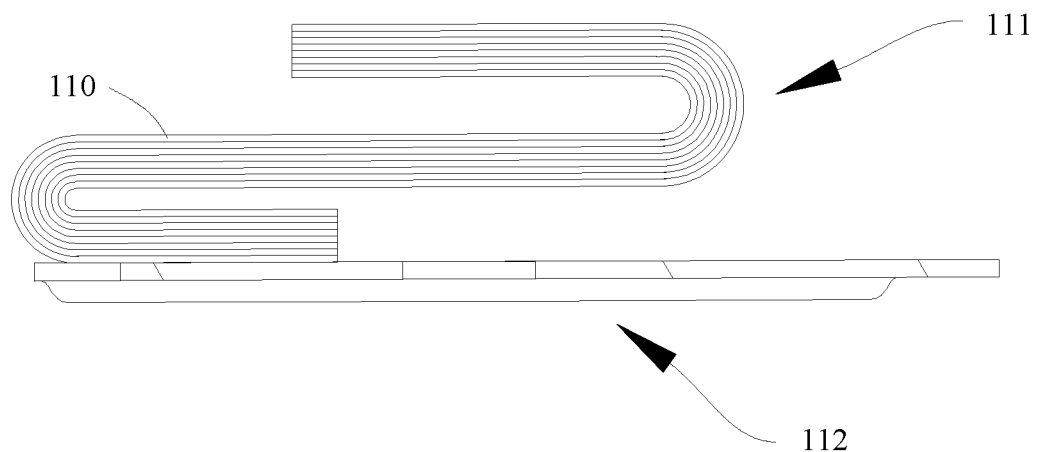
FIG. 9 is a schematic diagram of a first connection portion after bending according to an embodiment of the present application.

As shown in FIG. 4 and FIG. 5, a first bending region 113 is provided between the first section 1111 and the second section 1112, a second bending region 114 is provided between the second section 1112 and the third section 1113, and the first connection portion 111 bends into an S shape; it can be understood that, the second section 1112 bends around a first bending axis 115 relative to the first section 1111 to form the first bending region 113, and the third section 1113 bends around a second bending axis 116 relative to the second section 1112 to form the second bending region 114. The first connection portion 111 has an opposite first face (not shown in the figure) and a second face (not shown in the figure), the bending form of the first connection portion 111, is at the first bending region 113, the first face is located at an inner ring of the first bending region 113, the second face is located at an outer ring of the first bending region 113, and a bending radius of the conductive sheet 110 close to the first face is smaller, the bending radius of the conductive sheet 110 close to the second face is larger; at the second bending region 114, the first face is located at the outer ring of the second bending region 114, and the second face is located at the inner ring of the second bending region 114, the bending radius of the conductive sheet 110 close to the first face is larger, and the bending radius of the conductive sheet 110 close to the second face is smaller; FIG. 9 shows a schematic diagram of the first connection portion 111 after bending according to an embodiment of the present application, in FIG. 9, after the first connection portion 111 bends twice as mentioned above, the bending extension of each layer of the conductive sheet 110 is the same, that is, edges of the two ends of the connection portion of each layer of the conductive sheet 110 are flush; and then, on the one hand, so that the force on each layer of the conductive sheet 110 of the first connection portion 111 is uniform and is not prone to breakage, on the other hand, a height of the first connection portion 111 after bending is controlled, so that to ensure the energy density of the battery cell 101, and avoid the problems such as the phenomenon of delamination occurs in the multilayer structure, the inner layer easily wrinkles, the height increases after bending lead by this, an installation space is occupied, and assembly of the battery cell 101 is not convenient.

In some embodiments of the present application, the two adjacent layers of the conductive sheet 110 of the multiple layers of conductive sheets 110 are welded or connected by the conductive adhesive at the third section 1113, so that the hardness of the third section 1113 is greater than the hardness of the second section 1112. It can be understood that, when the two adjacent layers of the conductive sheet 110 are welded or connected by the conductive adhesive at the third section 1113, the hardness of the third section 1113 is increased. When the third section 1113 bends relative to the second section 1112, it is easy to guide the first connection portion 111 to deform at the connection between the third section 1113 and the second section 1112, which reduces the bending difficulty.

In some embodiments of the present application, the two adjacent layers of the conductive sheet 110 of the multiple layers of conductive sheets 110 are welded or connected by the conductive adhesive at the first section 1111, so that the hardness of the first section 1111 is greater than the hardness of the second section 1112. It can be understood that, when the two adjacent layers of the conductive sheet 110 are welded or connected by the conductive adhesive at the first section 1111, the hardness of the first section 1111 is increased. When the first section 1111 bends relative to the second section 1112, it is easy to guide the first connection portion 111 to deform at the connection between the first section 1111 and the second section 1112, which reduces the bending difficulty.

It should be pointed out that, an area division of the first section 1111, the second section 1112, and the third section 1113 of the first connection portion 111 is shown in FIG. 4. In the figure, the slash at the first section 1111 indicates the connection region of the multiple layers of conductive sheets 110 at the first section 1111. The slash at the third section 1113 indicates the connection region of the multiple layers of conductive sheets 110 at the third section 1113, not the morphology of the multiple layers of conductive sheets 110 after connection.

In some embodiments of the present application, the first connection portion 111 and the second connection portion 112 are welded or connected by the conductive adhesive. Adopting the connection mode of welding or conductive adhesive can ensure the connection strength, and at the same time ensure the passage of the current. For example, the first connection portion 111 and the second connection portion 112 are laser welded, so that the first connection portion 111 and the second connection portion 112 have the better connection stability, and can also ensure the passage of the current. In other embodiments of the present application, the connection mode of the first connection portion 111 and the second connection portion 112 may also be other modes that can implement metal connection, such as riveting, bolting, and the like.

It should be pointed out that, the welding of the first connection portion 111 and the second connection portion 112 may be the welding of the multiple layers of conductive sheets 110 and the second connection portion 112 at the same time; alternatively, it can be that, after the two adjacent layers of the conductive sheet 110 of the multiple layers of conductive sheets 110 are welded, the multiple layers of conductive sheets 110 can be entirely welded to the second connection portion 112; it can also be that, after one layer of the conductive sheet 110 of the multiple layers of conductive sheets 110 is welded to the second connection portion 112, two adjacent layers of the conductive sheet 110 of the multiple layers of conductive sheets 110 are welded.

In some embodiments of the present application, as shown in FIG. 3, FIG. 4 and FIG. 7, the second connection portion 112 includes a first surface 1124 facing an electrode assembly 13 and a second surface 1125 facing away from the electrode assembly 13, and the first connection portion 111 is connected to the second surface 125. Since the first surface 1124 is welded to the electrode assembly 13, the connection between the first connection portion 111 and the second surface 1125 can avoid interference in the welding of the second connection portion 112 and the electrode assembly 13, and ensure a connection area between the second connection portion 112 and the electrode assembly 13, and then ensure the stability of both.

Figure 10:
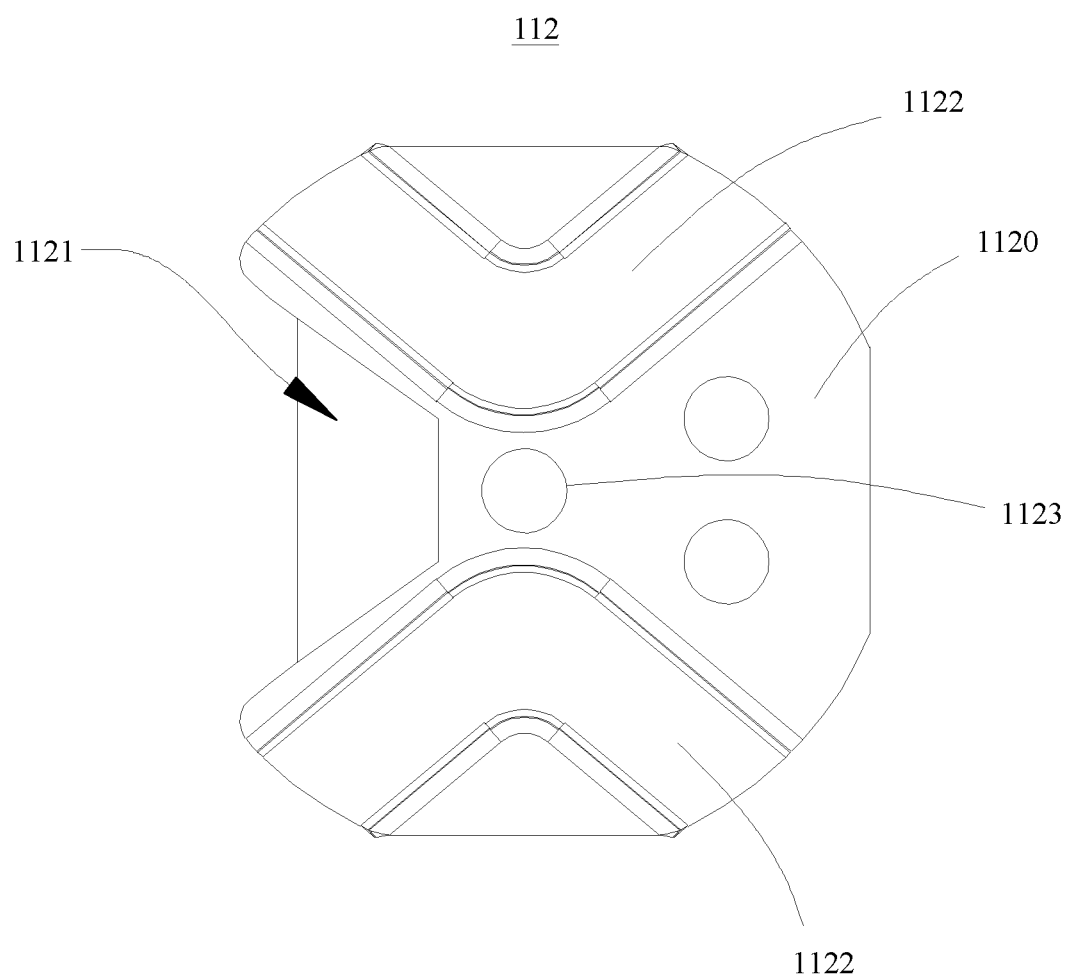
FIG. 10 is a schematic diagram of a second connection portion according to an embodiment of the present application.

FIG. 10 shows a schematic diagram of the second connection portion 112 according to an embodiment of the present application. In some embodiments of the present application, as shown in FIG. 4 and FIG. 10, the second connection portion 112 includes a first connection region 1121 for connecting with the first connection portion 111 and two second connection regions 1122 for connecting with the electrode assembly 13, and the first connection region 1121 is located between the two connection regions 1122. The first connection region 1121 is located between the two second connection regions 1122, and the assembly space is reasonably allocated to ensure that the connection force between the second connection portion 112 and the electrode assembly 13 is balanced, and the connection between the first connection portion 111 and the second connection portion 112 is stable.

In some embodiments of the present application, as shown in FIG. 3, FIG. 4 and FIG. 10, the second connection portion 112 includes a main body region 1120, the first connection region 1121 for connecting with the first connection portion 111, and the two second connection regions 1122 for connecting with the electrode assembly 13, and the first connection region 1121 is located between the two second connection regions 1122, the maximum thickness of the first connection region 1121 is smaller than the minimum thickness of the main body region 1120, and the maximum thickness of the first connection region 1121 is smaller than the minimum thickness of one of the two second connection regions 1122 that has the smaller thickness.

Figure 11:
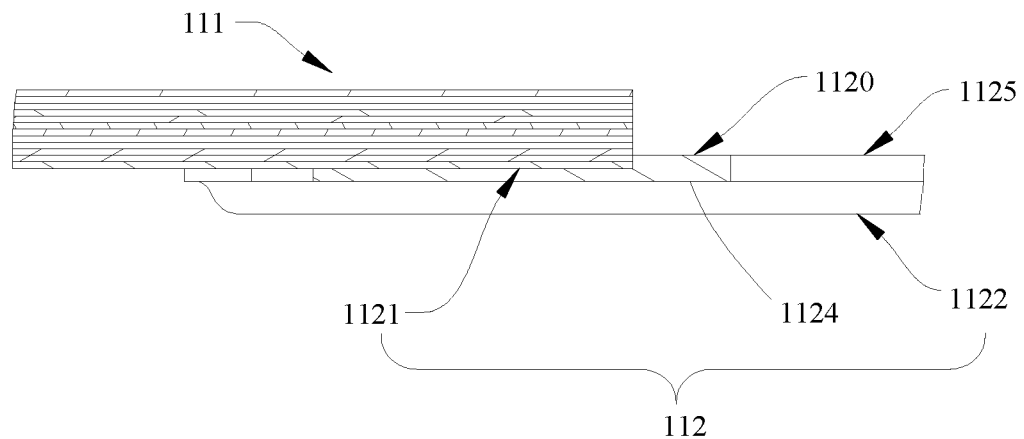
FIG. 11 is a partial enlarged view of a connection position of the first connection portion and a first connection region according to an embodiment of the present application.

The first connection region 1121 can be formed by reducing the thickness of the second connection portion 112. Under the condition that the connection between the first connection portion 111 and the first connection region 1121 is ensured, the thickness of the first connection region 1121 is reduced as much as possible. It can be understood that, the first connection region 1121 is the thinnest part of the second connection portion 112. An assembly thickness of the first connection portion 111 connected to the first connection region 1121 is thinner than the assembly thickness of the first connection portion 111 with the main body region 1120 and the second connection region 1122. The space occupied by the first connection portion 111 and the second connection portion 112 is smaller, which improves the energy density of the battery cell 101. For example, FIG. 11 shows a partial enlarged view of the connection position of the first connection portion 111 and the first connection region 1121 according to an embodiment of the present application. As shown in FIG. 11, the thickness of the first connection region 1121 is smaller than the thickness of the main body region 1120 and the second connection region 1122. The second surface 1125 of the second connection portion 112 forms a stepped surface between the first connection region 1121 and the main body region 1120.

As shown in FIG. 3 and FIG. 11, in order to ensure the contact between the second connection region 1122 and the electrode assembly 13, and to ensure the welding quality of the second connection region 1122 and the electrode assembly 13, the second connection region 1122 protrudes towards the electrode assembly 13 relative to the main body region 1120. It can be understood that the two opposite faces in the thickness direction of the main body region 1120 are the first surface 1124 and the second surface 1125, respectively, and the second connection region 1122 protrudes from the first surface 1124 in the direction of the second surface 1125 pointing to the first surface 1124.

In the above embodiment, in order to ensure that the second connection region 1122 is connected to the inner and outer circle electrode plate of the winding structure of the electrode assembly 13, as shown in FIG. 4 and FIG. 10, the second connection region 1122 is in a V-shaped structure, and the V-shaped structure points to a center of the second connection portion 112, and the two second connection regions 1122 are provided oppositely to ensure that the connection force between the second connection portion 112 and the electrode assembly 13 is balanced. The first connection region 1121 is located between the two second connection regions 1122, and the contour of the first connection region 1121 matches the contours of the two second connection regions 1122 to ensure that the first connection portion 111 and the second connection portion 112 have a larger contact area, which facilitates to ensure the stable connection between the first connection portion 111 and the second connection portion 112. For example, the portion of the first connection portion 111 connected to the second connection portion 112 (that is, the first section 1111) is in a trapezoidal structure.

In order to facilitate realization of the connection and positioning of the second connection portion 112 and the electrode assembly 13, as shown in FIG. 4 and FIG. 10, the second connection portion 112 is provided with a through hole 1123. For example, the through hole 1123 may be located in the middle of the second connection portion 112, when the second connection portion 112 is assembled with the electrode assembly 13, the through hole 1123 is aligned with the winding center hole of the electrode assembly 13 to implement the assembly and positioning of the second connection portion 112 and the electrode assembly 13; at the same time, when the electrolyte is injected, it is convenient for the electrolyte to contact with the electrode assembly 13 after passing through the through hole 1123 to infiltrate the electrode assembly 13, and the air or the gas after the chemical reaction of the electrolyte in the electrode assembly 13 can be discharged through the through hole 1123. In other embodiments of the present application, multiple through holes 1123 may also be provided, and in addition to be provided in the middle of the second connection portion 112, they may also be distributed in other areas of the main body region 1120.

Figure 12:
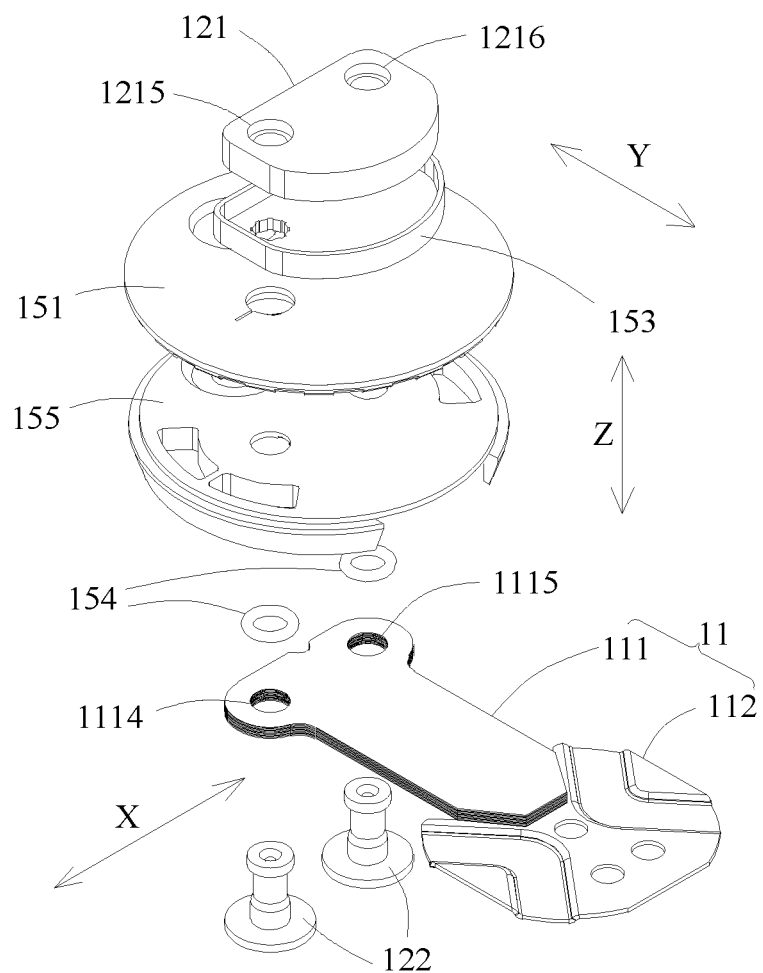
FIG. 12 is a schematic structural diagram of part of the components of the battery according to an embodiment of the present application.

FIG. 12 shows a schematic structural diagram of part of the components of the battery cell 101 according to an embodiment of the present application. In some embodiments of the present application, as shown in FIG. 3 and FIG. 12, the electrode terminal 12 includes a first connection member 121 and two second connection members 122; the battery cell 101 also includes a housing 14, an end cover 151, and a first insulating member 153. The housing 14 has an end opening 141, and the electrode assembly 13 and the adapting member 11 are provided inside the housing 14; the end cover 151 is configured to cover the end opening 141, the two second connection members 122 are installed on the end cover 151 and arranged at intervals along a first direction X; the two second connection members 122 are both connected to the first connection portion 111, and the first connection member 121 is located on a side away from the inside of the housing 14 of the end cover 151 and connected to two second connection members 122, so that to extract the electrical energy of electrode assembly 13 from the inside of the housing 14; the first connection member 121 is also used for electrical connection with other battery cells 101 or other current collecting members; the first insulating member 153 is provided between the first connection member 121 and the end cover 151, which is used to isolate the first connection member 121 and the end cover 151, and implement the isolation between the first connection member 121 and the end cover 151. It should be pointed out that, the first direction refers to the direction indicated by X shown in FIG. 12 and can be understood as the width direction of the adapting member 11.

The shape of the housing 14 is determined according to the combined shape of one or more electrode assemblies 13. For example, the housing 14 may be a hollow cuboid or cube or cylinder, and at least one face of the housing 14 has an end opening 141 such that one or more electrode assemblies 13 and the adapting member 11 may be placed in the housing 14. For example, as shown in FIG. 3, the housing 14 is a cylinder, and the end face of the housing 14 is provided with an end opening 141. The end cover 151 covers the end opening 141 and is connected to the housing 14 to form a closed chamber in which the electrode assembly 13 is placed. The housing 14 is filled with the electrolyte, such as the electrolytic solution.

It should be pointed out that, as shown in FIG. 3, the housing 14 has two opposite end openings 141, and the two end openings 141 respectively correspond to the positive tab and the negative tab of the electrode assembly 13, and each end opening 141 corresponding to an end cover assembly 150, as shown in FIG. 12, the end cover assembly 150 includes the end cover 151, the first insulating member 153, the first connection member 121, and the second connection member 122.

In some embodiments of the present application, as shown in FIG. 12, the first connection portion 111 is provided with a first connection hole 1114 and a second connection hole 1115 corresponding to the two second connection members 122. One second connection member 122 passes through the first connection member 1114, the end cover 151 and the first insulating member 153 and then is connected to the first connection member 121, and the other second connection member 122 passes through the second connection hole 1115, the end cover 151 and the first insulating member 153 and then is connected to the first connection member 121 to ensure the stable connection between the first connection portion 111 and the first connection member 121. For example, the first connection member 121 is provided with a third connection hole 1215 and a fourth connection hole 1216 corresponding to the two second connection members 122, and one second connection member 122 passes through the first connection hole 1114, the end cover 151 and the first insulating member 153, then is inserted into the third connection hole 1215 and riveted to the first connection member 121, and the other second connection member 122 passes through the second connection hole 1115, the end cover 151 and the first insulating member 153 and then is inserted into the fourth connection hole 1216, and is riveted with the first connection member 121.

It should be pointed out that, a sealing ring 154 (as shown in FIG. 12) is provided at the connection between each second connection member 122 and the end cover 151 to implement insulation and isolation between the electrode terminal 12 and the end cover 151. The number of the second connection members 122 can be selected according to actual conditions. For example, the number of the second connection members 122 can be one, or three or more.

In some embodiments of the present application, the first connection portion 111 is welded to the electrode terminal 12 to ensure connection strength of the first connection portion 111 and electrode terminal 12.

Figure 13:
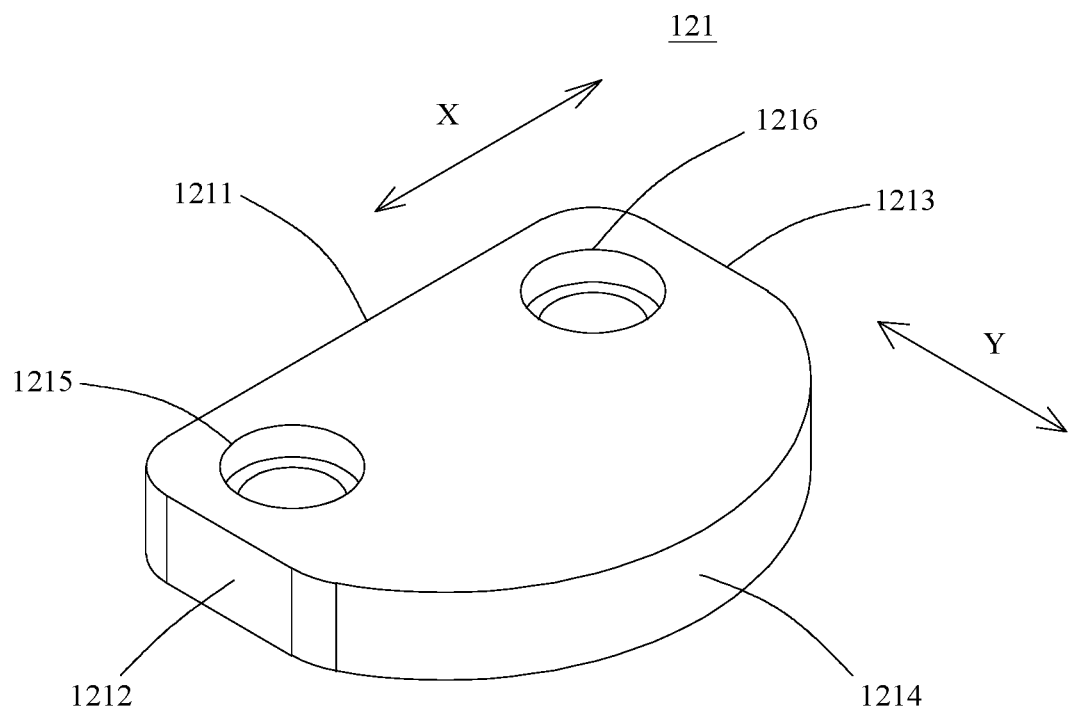
FIG. 13 is a schematic structural diagram of a first connection member to an embodiment of the present application.
Figure 14:
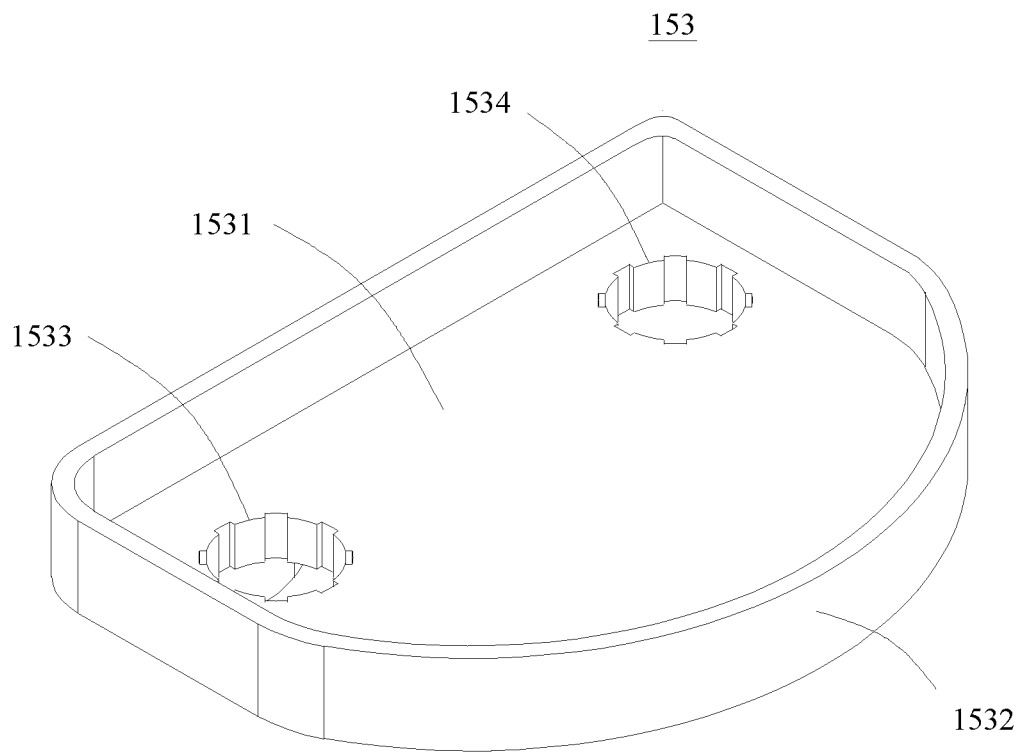
FIG. 14 is a schematic structural diagram of a first insulating member according to an embodiment of the present application.
Figure 15:
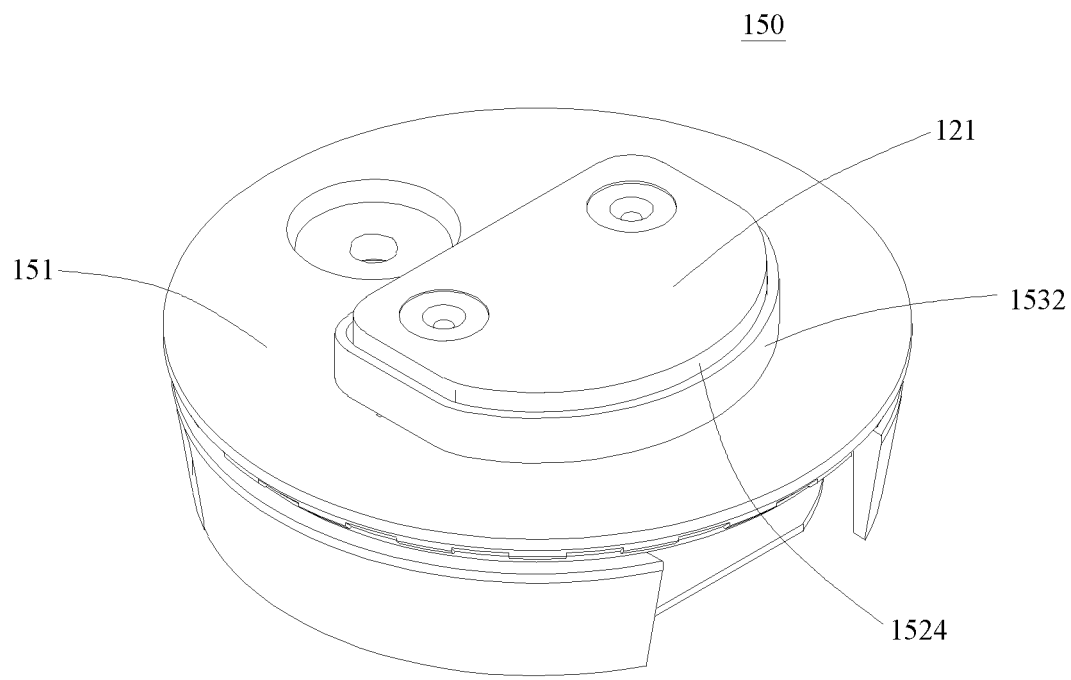
FIG. 15 is a schematic structural diagram of an end cover assembly according to an embodiment of the present application.

FIG. 13 shows a schematic structural diagram of the first connection member 121 according to an embodiment of the present application; FIG. 14 shows a schematic structural diagram of the first insulating member 153 according to an embodiment of the present application; and FIG. 15 shows a schematic structural diagram of the end cover assembly 150 according to an embodiment of the present application.

In some embodiments of the present application, as shown in FIG. 12 and FIG. 13, the first connection member 121 includes a first side 1211, a second side 1212, a third side 1213, and a fourth side 1214. The second side 1212 and the third side 1213 are provided oppositely along the first direction X, and the first side 1212 and the fourth side 1214 are provided oppositely along the second direction Y; the second direction Y, the first direction X and the thickness direction Z of the end cover 151 are perpendicular to each other; the first side 1211, the second side 1212 and the third side 1213 are all planes, and the fourth side 1214 is an arc surface centered on the center of the end cover 151.

As shown in FIG. 13, the two ends of the second side 1212 along the second direction Y are respectively connected to the first side 1211 and the fourth side 1214, and the two ends of the third side 1213 along the second direction Y are respectively connected to the first side 1211 and the fourth side 1214. It can be understood that, the first side 1211, the second side 1212, the third side 1213, and the fourth side 1214 constitute the side of the first connection member 121, and the first connection member 121 also has two end faces facing the end cover 151 and facing away from the end cover 151 (not shown in the figure), the end face of the first connection member 121 facing the end cover 151 is in contact with the first insulating member 153. In FIG. 14, the first insulating member 153 includes a bottom wall 1531 and a peripheral wall 1532 formed around the bottom wall 1531, the bottom wall 1531 is located between the first connection member 121 and the end cover 151, the bottom wall 1531 is provided with a fifth connection hole 1533 and a sixth connection hole 1534, the fifth connection hole 1533 corresponds to the third connection hole 1215, and the sixth connection hole 1534 corresponds to the fourth connection hole 1216 for the two second connection members 122 to pass through; the contour of the peripheral wall 1532 corresponds to the side of the first connection member 121, as shown in FIG. 15, the peripheral wall 1532 wraps the above side of the first connection member 121 to further ensure the insulation and isolation between the end cover 151 and the first connection member 121.

The structural form of the first connection member 121 in the embodiment of the present application has a larger overcurrent area, which improves the overcurrent capacity and the output power of the battery cell 101. As shown in FIG. 15, the fourth side 1214 is the arc surface, the fourth side 1214 is close to the edge of the end cover 151 relative to other sides. The distance between each point on the fourth side 1214 along the radial direction of the end cover 151 and the edge of the end cover 151 is equal, which can prevent the first insulating member 153 from being deformed and damaged during welding and assembling, so that to affect the appearance. The welding assembly here may include, but is not limited to, the welding assembly of the end cover 151 and the housing 14.

In order to ensure the insulation effect, as shown in FIG. 12, the end cover assembly 150 further includes a second insulating member 155, the second insulating member 155 is configured between the end cover 151 and the first connection portion 111, and the second insulating member 155 isolates the end cover 151 from the first connection portion 111.

An embodiment of the present application further provides a power consumption device, which may include the battery 100 in the above embodiments. In some embodiments, the power consumption device may be a vehicle 1000, a ship or a spacecraft.

The battery cell 101, the battery 100 and the power consumption device of the embodiment of the present application are described above, and a battery cell 101 manufacturing method and device of the embodiments of the present application will be described below. For the parts that are not described in detail, reference is made to the foregoing embodiments.

Figure 16:
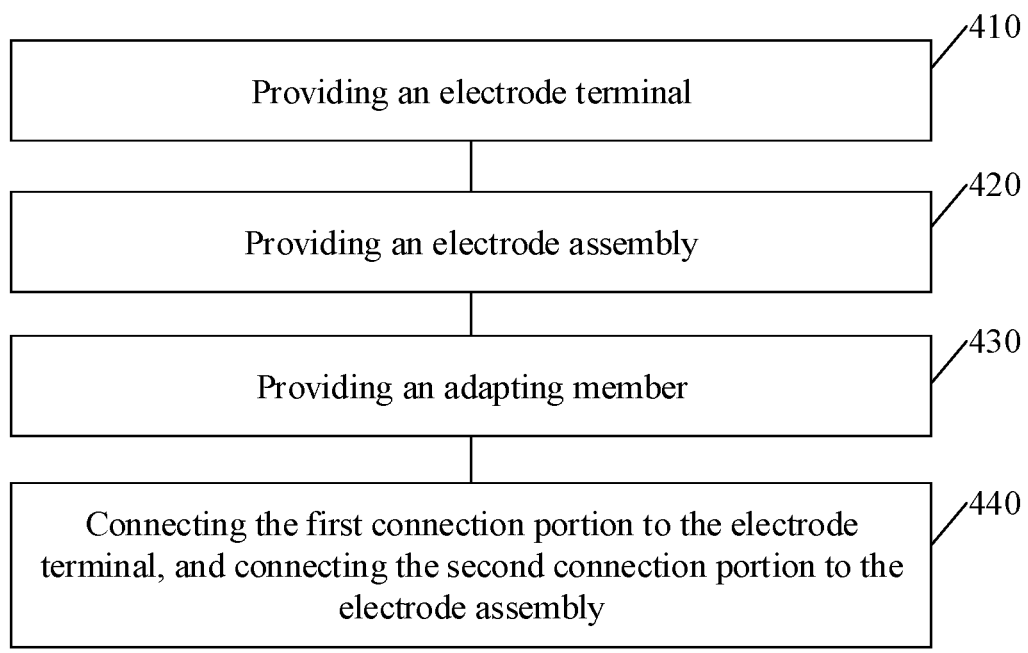
FIG. 16 is a schematic flowchart of a battery cell manufacturing method according to an embodiment of the present application.

FIG. 16 is a schematic flowchart of a battery cell manufacturing method according to an embodiment of the present application. As shown in FIG. 16, the method may include:
410, providing the electrode terminal 12;
420, providing the electrode assembly 13;
430, providing the adapting member 11, the adapting member 11 includes the first connection portion 11 and the second connection portion 12, the first connection portion 111 and the second connection portion 112 are dividedly set and connected to each other, and the first connection portion 111 is in the multilayer structure and includes the multiple layers of conductive sheets 110 provided in the stacking manner, the second connection portion 112 is in the single-layer structure, and the minimum thickness of the first connection portion 111 is greater than the maximum thickness of the second connection portion 112;
440, connecting the first connection portion 111 to the electrode terminal 12, and connecting the second connection portion 112 to the electrode assembly 13.

It should be pointed out that, the above steps show the battery cell 101 manufacturing method provided by the implementation of this application, where the sequence of the steps "410, providing an electrode terminal 12", "420, providing an electrode assembly 13" and "430, providing an adapting member 11" is not unique and can be adjusted. For example, the steps "420, provide an electrode assembly 13", "410, provide an electrode terminal 12" and "430, provide an adapting member 11" are performed sequentially; alternatively, the steps "430, providing an adapting member 11", "410, providing an electrode terminal 12" and "420, providing an electrode assembly 13" are performed sequentially; alternatively, the steps "430, providing an adapting member 11", "420, providing an electrode assembly 13" and "410, providing an electrode terminal 12" are performed sequentially.

Figure 17:
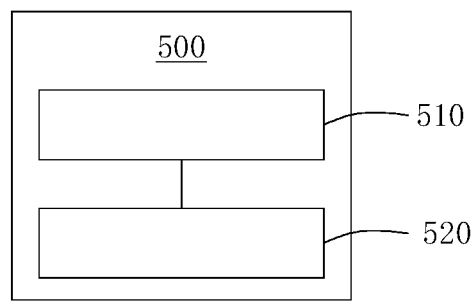
FIG. 17 is a schematic block diagram of a battery cell manufacturing device in an embodiment of the present application.

FIG. 17 is a schematic block diagram of a battery cell manufacturing device 500 according to an embodiment of the present application. As shown in FIG. 17, the battery cell manufacturing device 500 may include: a provision module 510 and an installation module 520.

The provision module 510, configured to provide the electrode terminal 12; provide the electrode assembly 13; and provide the adapting member 11, the adapting member 11 includes the first connection portion 111 and the second connection portion 112, the first connection portion 111 and the second connection portion 112 are dividedly set and connected to each other, and the first connection portion 111 is in the multilayer structure and includes the multiple layers of conductive sheets 110 provided in the stacking manner, the second connection portion 112 is in the single-layer structure, and the minimum thickness of the first connection portion 111 is greater than the maximum thickness of the second connection portion 112;

the installation module 50, configured to connect the first connection portion 111 to the electrode terminal 12, and configured to connect the second connection portion 112 to the electrode assembly 13.

It should be noted that, the features in the embodiments may be mutually combined provided that no conflict is caused.

Finally, it should be noted that the above embodiments are merely used for illustrating rather than limiting the technical solutions of the present application. Although the present application is illustrated in detail with reference to the foregoing embodiments, those of ordinary skill in the art should understand that they can still modify the technical solutions described in the foregoing embodiments, or make equivalent substitutions to some of the technical features therein, but these modifications or substitutions can be made to the respective technical solutions without departing from the spirit and scope of the technical solutions of the embodiments of the present application.

What is claimed is:

1. A battery cell, comprising:
an adapting member, comprising a first connection portion for connecting an electrode terminal and a second connection portion for connecting an electrode assembly, wherein the first connection portion and the second connection portion are dividedly set and connected to each other, and the first connection portion is in a multilayer structure and comprises multiple layers of conductive sheets provided in a stacking manner, the second connection portion is in a single-layer structure, and a minimum thickness of the first connection portion is greater than a maximum thickness of the second connection portion.

2. The battery cell according to claim 1, wherein a minimum thickness of the second connection portion is greater than a maximum thickness of any of the multiple layers of conductive sheets.

3. The battery cell according to claim 2, wherein a thickness of each of the multiple layers of conductive sheets is equal.

4. The battery cell according to claim 2, wherein the second connection portion comprises a first surface facing the electrode assembly and a second surface facing away from the electrode assembly, and the first connection portion is connected to the second surface.

5. The battery cell according to claim 2, wherein the first connection portion comprises a first section, a second section, and a third section, the first section is configured to connect to the second connection portion, the third section is configured to connect to the electrode terminal, the second section connects to the first section and the third section, and the first section and the third section are respectively located on two sides of the second section in a thickness direction.

6. The battery cell according to claim 1, wherein a thickness of each of the multiple layers of conductive sheets is equal.

7. The battery cell according to claim 1, wherein two adjacent layers of the multiple layers of conductive sheets are welded or connected by a conductive adhesive.

8. The battery cell according to claim 1, wherein the first connection portion and the second connection portion are welded or connected by a conductive adhesive.

9. The battery cell according to claim 1, wherein the second connection portion comprises a first surface facing the electrode assembly and a second surface facing away from the electrode assembly, and the first connection portion is connected to the second surface.

10. The battery cell according to claim 1, wherein the first connection portion comprises a first section, a second section, and a third section, the first section is configured to connect to the second connection portion, the third section is configured to connect to the electrode terminal, the second section connects to the first section and the third section, and the first section and the third section are respectively located on two sides of the second section in a thickness direction.

11. The battery cell according to claim 10, wherein the two adjacent layers of the multiple layers of conductive sheets are welded or connected by a conductive adhesive at the third section, so that a hardness of the third section is greater than a hardness of the second section.

12. The battery cell according to claim 10, wherein the two adjacent layers of the multiple layers of conductive sheets are welded or connected by a conductive adhesive at the first section, so that a hardness of the first section is greater than the hardness of the second section.

13. The battery cell according to claim 1, wherein the second connection portion comprises a first connection region for connecting to the first connection portion, and two second connection regions for connecting to the electrode assembly, and the first connection region is located between the two second connection regions.

14. The battery cell according to claim 1, wherein the second connection portion comprises a main body region, a first connection region for connecting to the first connection portion, and two second connection regions for connecting to the electrode assembly, and the first connection region is located between the two second connection regions, a maximum thickness of the first connection region is smaller than a minimum thickness of the main body region, and the maximum thickness of the first connection region is smaller than the minimum thickness of one of the two second connection regions that has the smaller thickness.

15. The battery cell according to claim 1, wherein the electrode terminal comprises a first connection member and two second connection members, and the battery cell further comprises:
a housing, with an end opening, and the electrode assembly and the adapting member being provided in the housing;
an end cover, being configured to cover the end opening, the two second connection members being installed on the end cover and arranged at intervals along a first direction; the two second connection members being both connected to the first connection portion, and the first connection member being located on a side away from the inside of the housing of the end cover and connected with two second connection members; and
a first insulating member, being provided between the first connection member and the end cover, and being configured to isolate the first connection member and the end cover.

16. The battery cell according to claim 15, wherein the first connection member comprises a first side, a second side, a third side, and a fourth side; the second side and the third side are provided oppositely along the first direction, and the first side and the fourth side are provided oppositely along a second direction; the second direction, the first direction and a thickness direction of the end cover are perpendicular to each other; the first side, the second side and the third side are all planes, and the fourth side is an arc surface centered on a center of the end cover.

17. A battery, comprising the battery cell according to claim 1.

18. A power consumption device, comprising the battery according to claim 17.

19. A battery cell manufacturing method, comprising:
providing an electrode terminal;
providing an electrode assembly;
providing an adapting member, comprising a first connection portion and a second connection portion, wherein the first connection portion and the second connection portion are dividedly set and connected to each other, and the first connection portion is in a multilayer structure and comprises multiple layers of conductive sheets provided in a stacking manner, the second connection portion is in a single-layer structure, and a minimum thickness of the first connection portion is greater than a maximum thickness of the second connection portion; and connecting the first connection portion to the electrode terminal, and connecting the second connection portion to the electrode assembly.

\* \* \* \* \*